R. L. WHITNEY.
BEARING.
APPLICATION FILED OCT. 16, 1914.
1,153,986.
Patented Sept. 21, 1915.
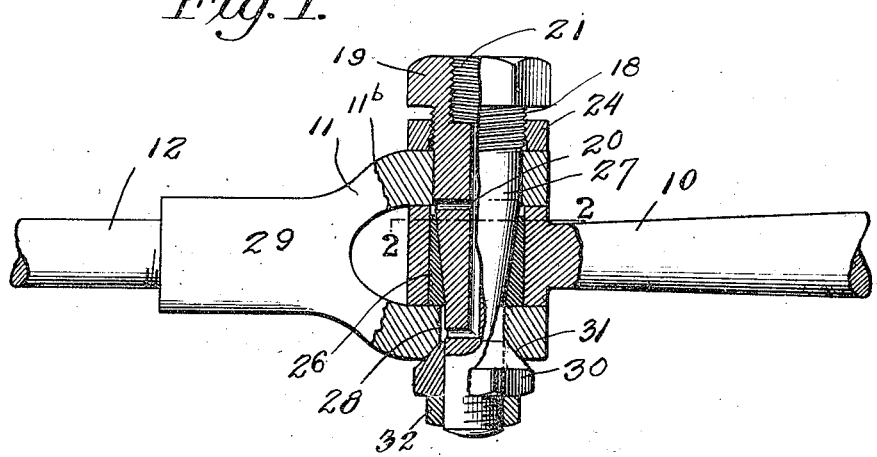
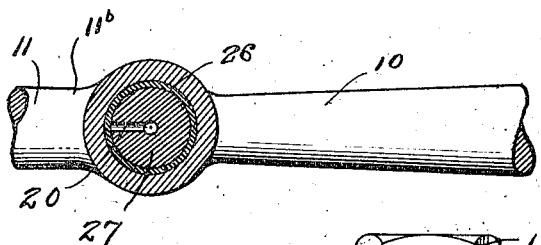
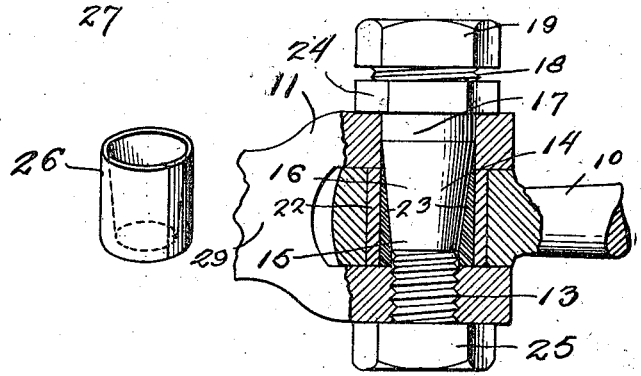
Witnesses
Fenton S. Belt
Chas. Nilsen Jr.
Inventor
Raynard L. Whitney
By H L Woodward
Attorney

UNITED STATES PATENT OFFICE.

RAYNARD L. WHITNEY, OF ELMIRA, NEW YORK.

BEARING.

1,153,986.　　　Specification of Letters Patent.　　Patented Sept. 21, 1915.

Application filed October 16, 1914.　Serial No. 867,011.

*To all whom it may concern:*

Be it known that I, RAYNARD L. WHITNEY, a citizen of the United States, residing at Elmira, in the county of Chemung and State of New York, have invented certain new and useful Improvements in Bearings, of which the following is a specification.

The invention has for an object to provide a bushing for bearings adjustable to compensate for wear, whereby a journaled member may be kept snugly engaged in the bearing and loose movement obviated.

It is a particular object to provide a bushing and spindle bolt suitable for situations such as connections between the steering arms on the wheel spindles of a motor vehicle and the connecting rod therebetween, and between the connecting rod and the operating rod or similar connections.

Another object is to provide a novel and desirable mounting for the bolt.

Additional objects, advantages and features of invention will appear from the construction, arrangement and combination of parts hereinafter set forth and shown in the drawings, where—

Figure 1 is a fragmentary view of a spindle arm and connection partly in section. Fig. 2 is a cross section on the line 2—2 of Fig. 1. Fig 3 is a detail of the bushing. Fig. 4 is a view similar to Fig. 1 of another embodiment of the invention.

There is illustrated a spindle arm 10 of the usual type customarily provided, pivoted upon which is the usual connecting rod yoke 11, into the outer end of which the connecting rod 12 is screwed. The outer ends of the arms of the yoke and the end of the arm 10 are enlarged and provided with the usual concentric bores, as shown in Fig. 4, the lower of which is threaded, in the yoke, and receives the threaded end 13 of the bolt 14, the end 13 of which is of the usual size in the standard bolts supplied for such connections. Inwardly of the threaded part 13, a conical portion 15 is formed on the bolt, the lower part of which corresponds in diameter to the minimum diameter of the opening through the lower arm of the yoke 11. The bolt from this point is gradually enlarged until it attains the diameter of the smooth bore 16 through the upper arm of the yoke 11, where the bolt is provided with a smooth cylindrical portion 17 engaging snugly in the bore of the yoke, a threaded portion 18 of suitable diameter being formed thereabove to extend a distance above the yoke, the bolt being also provided with the usual hexagonal head 19 above this last mentioned threaded part. The bolt is also bored as at 20 for lubrication of the bearing, and fitted as at 21 in the customary way for the engagement of oil or grease cup.

Fitted in the bore of the arm 10 there is the usual bushing 22 of bronze or other suitable metal, and engaged between this bushing and the bolt there is an expanding sleeve 23, of steel cylindrical on its exterior to engage snugly within the bushing, and conical on the interior to fit closely upon the tapered portion of the bolt, the taper of the sleeve terminating a short distance from its lower end, as shown. Initially the bolt is provided with a nut 24, closely adjacent its head and is inserted downwardly through the yoke 11 and the interposed arm 10 and its bushing, into which the sleeve 23 has been previously driven. The bolt passes through this sleeve and its lower threaded end is engaged in the lower threaded opening in the yoke, into which it is screwed until the sleeve 23 has been fully expanded to properly engage the bushing 22. The bolt 24 is then tightened, and a lock nut 25 is then engaged on the lower end of the bolt, which projects through the yoke. As the bushing becomes worn, the nuts 24 and 25 are loosened from time to time and the bolt 14 screwed inwardly and the nuts again tightened.

The arrangement described permits the application of my adjustable construction in connections where standard fittings and bushings have been employed, without change or fitting, enabling the use of the customary bushing.

In Fig. 1 another application of the invention is illustrated, in which the bushing 26 is tapered, and the necessity for the sleeve 23 eliminated. It will be understood that this bushing may be shaped in the same way that the sleeve 23 is, on the interior, and used in conjunction with the bolt 14. In this view, however, the bolt shown at 27, has a somewhat longer taper, and the bushing 26 is without a cylindrical portion. The lower reduced part of the bolt clears the opening 28 through the lower arm of the yoke 29, and a cone 30 is threaded on the lower ends of the bolt, engaged in a corresponding seat 31 formed in the lower side of the yoke. A lock nut 32 is engaged on the end of the bolt outwardly of the cone 30. The bolt is otherwise formed and held in the yoke in the same way as already described, in the first mentioned embodiment.

In the use of this last embodiment of the invention it is simply necessary to engage the bushing 26 in the bore through the outer end of the spindle arm, insert the bolt 27 downwardly through the yoke and bushing and engage the cone 30 thereon, screwing it up until a proper bearing is secured, after which the lock nuts 32 and 24 are tightened.

It will be seen that an extremely simple adjustment is provided, requiring only the adjustment of a single bolt to take up play in bearings of this character and the device represents no objectionable expense as compared to the bushings customarily employed at present in such connections.

What is claimed:

1. In a connection of the class described, a yoke, a bolt having an enlarged smooth cylindrical portion revoluble in one arm of the yoke, an intermediate tapered portion and an outer reduced threaded portion in snug engagement in an opposite arm of the yoke, a bored element revoluble in the yoke, a member engaged in said element having a tapered inner portion fitted snugly on the tapered part of the bolt, and means to adjust the bolt longitudinally and secure it in adjusted position.

2. In a connection of the class described, a bolt having an upper threaded portion, an adjacent smooth cylindrical part inwardly thereof, an intermediate tapered portion and a lower threaded portion, nuts engaged with the threaded portions of the bolts, and a bushing member interiorly tapered, for the purposes described.

3. In a connection of the class described, a bifurcated yoke member having a smooth bored opening through one arm, a concentric smaller threaded opening through the other; a member revoluble between the arms, having a bore larger than said smaller opening; a split bushing member snugly and revolubly engaged in said revoluble member and having a tapered opening therethrough with its larger end toward said smooth bore of the yoke; a bolt member having a reduced threaded outer end engaged in said threaded opening, an intermediate tapered part on the bolt snugly fitted in the bushing, a smooth cylindrical portion engaged snugly and revolubly in the smooth bored arm of the yoke, a threaded portion on the bolt outwardly of said cylindrical part and forming a continuation of said part, a head at the larger extremity of the bolt and nuts engaged on each threaded part of the bolt outwardly of the yoke, and bearing against respective arms.

In testimony whereof I have affixed my signature in presence of two witnesses.

RAYNARD L. WHITNEY.

Witnesses:
JULIA McHENRY,
H. M. LOVELL.